(12) United States Patent
Wilensky

(10) Patent No.: US 8,054,317 B1
(45) Date of Patent: Nov. 8, 2011

(54) METHODS AND SYSTEMS FOR COMPARING AND DISCOVERING AND ORGANIZING COLOR THEMES AND WORD TAG ASSOCIATIONS

(75) Inventor: Gregg Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 991 days.

(21) Appl. No.: 11/952,564

(22) Filed: Dec. 7, 2007

(51) Int. Cl.
*G09G 5/02* (2006.01)

(52) U.S. Cl. ........ 345/593; 345/589; 345/595; 382/168; 382/224; 382/225; 382/227; 382/228

(58) Field of Classification Search .................. None
See application file for complete search history.

(56) References Cited

U.S. PATENT DOCUMENTS

| | | | | |
|---|---|---|---|---|
| 7,352,895 | B2 * | 4/2008 | Speigle et al. | 382/162 |
| 7,415,153 | B2 * | 8/2008 | Mojsilovic | 382/162 |

OTHER PUBLICATIONS

D.M. Conway, "An Experimenttal Comparision of Three Natural Language Colour Naming Models," In Proc. east-west Int. conf on Human-Computer Interaction, 1992, pp. 328-339.
J.M. Lammens, A Computational Model of Color Perception and Color Naming. PhD thesis, University of Buffalo, Jun. 1994.
A. Mojsilovic, A Computational Model for Color Naming and Describing Color Composition of Images, IEEE Transactions on Image Processing, 14(5):690-699, May 2005.
R. Benavente et al., A Data Set for Fuzzy Colour Naming, Color Research and Application, 31(1): 48-56. 2006.
J. Van De Weijer et al. Learing Color Names from Real-World Images, Proc. CVPRO7, Minneapolis, USA, 2007.
Y. Freund et al., A Decision-Theoretic Generalization of On-Line Learning and an Application to Boosting, Journal of Computer and System Sciences, 1997.
J. Platt, Platt Scaling Algorithm: Probablistic Outputs for Support Vector Machines and Comparison to Regularized Likelihood Methods, in Advances In Large Margin Classifiers, Mar. 26, 1999, pp. 1-11.
H.-T. Lin, A Note on Platt's Probabilistic Outputs for Support Vector Machines, 2003.
Kuler—color theme application http://kuler.adobe.com/# (updated Aug. 6, 2007).

* cited by examiner

*Primary Examiner* — Antonio Caschera
(74) *Attorney, Agent, or Firm* — Kilpatrick Townsend & Stockton LLP

(57) ABSTRACT

Methods and systems for comparing and organizing color themes and word tag associations. One embodiment comprises a method for determining associated color themes based on an identified color theme by determining the distance between the identified color theme and each color theme of the collection of color themes, wherein each distance includes a color-based distance and the determined subset of associated color themes from the collection is based at least in part on the calculated distances from the identified color theme. Another embodiment comprises a method that allows an application to suggest tags for an identified color theme based on its similarity to color themes and associated tags of the color theme collection. Another embodiment suggests color themes based on an identified tag, and yet another embodiment suggests tags based on an identified tag.

24 Claims, 6 Drawing Sheets

Input: Color Theme P

900 →

Output – Suggested word tags:

910 → Family gathering, Fun, Green, Lime, Peach, Picnic, Red, Rose, Summer, Melon, Sun, White, Lime, Park, Happy, Honeydew, Lime, Evening, Olives, Hot, Afternoon Color Theme H
C1           C2            C3
(59, 52, -6) (61, -37, 36) (92, 15, -11)

Color Theme E
C1           C2            C3
(62, 68, -3) (91, 17, -13) (90, -34, 34)

Color Theme R
C1            C2          C3
(86, -29, 37) (97, -7, 9) (91, -19, 23)

Note: colors are indicated as 8 bit Lab values: (L, a, b)

METHODS AND SYSTEMS FOR COMPARING AND DISCOVERING AND ORGANIZING COLOR THEMES AND WORD TAG ASSOCIATIONS

FIELD OF THE INVENTION

The present invention relates generally to methods and systems for comparing and organizing color themes and word tag associations, including methods and systems for searching, suggesting and organizing color themes based on color theme and/or word tag similarities.

BACKGROUND

A color theme is generally a set of several colors that are typically thematically related, but may also be defined as a single color. Color themes can be useful for the design of Web pages, print documents, design schemes, interior decorating, clothing lines, etc. Color themes have grown larger and more extensive over the years. It is not uncommon for a computerized collection of color themes to reach five, ten or even fifty thousand color themes, often left unsorted or uncategorized in the digital version of a junkyard. Current methods of using large collections of color themes often involve the use of tags. Generally, tags provide a highly flexible approach to organizing any kind of content. In the color theme context, tags, often a set of one or more words, are typically used to describe the look and feel of a color theme, the purpose of a color theme, or for other descriptive purposes, but may be arbitrarily assigned. For example, a color theme for a child's playroom might be tagged with "playful," "cheerful," or perhaps "Mary," if that is the child's name, to describe the purpose or content of the color theme. Tags may be metadata and can take other forms aside from keywords. Various tags are supported by Adobe® products Photoshop®, Illustrator®, Creative Suite®, Kuler™ and others.

The present version of Kuler™ (http://kuler.adobe.com/), an on-line application helps designers, such as interior decorators, Web page architects, document planners, or even ordinary consumers, choose, create, and share color themes on-line with others, and search for various color themes with associated tags. Kuler™ users can create a color theme for a new home office and associate the color theme with one or more tags, such as "cozy," "rebirth," etc. and then search for that color theme and other available color themes tagged with those exact tags (keywords).

Browsing through color theme collections becomes more difficult as the collection grows. Additionally, current color theme collection applications typically do not allow users to simply search for similar color themes based on an inputted or selected color theme. Present applications also fail to adequately facilitate consistent and relevant tagging of color themes. Generally, users are forced to manually browse through a color theme collection or use exact tag-based searching to view the tags used by others for related color themes.

SUMMARY

Embodiments of the present invention provide methods and systems for comparing and organizing color themes and word tag associations, including methods and systems for searching, suggesting and organizing color themes and associated tags, based on color theme and/or tag similarities. One embodiment of the present invention encompasses various techniques that may be used to quantify or otherwise determine how related or similar color themes are to one another, including methods that take into account user-supplied tags and/or color themes, and may provide suggested tags for inputted color themes and/or tags. Another embodiment of the invention is a method of determining associated or suggested color themes based on an identified tag.

One embodiment is a method for determining associated color themes based on an identified color theme. In this method, a specific color theme is inputted and a collection of color themes stored on at least one computing device is identified. Each color theme of the collection comprises one or more colors. The similarity of the inputted color theme to each color theme in the collection is determined by calculating and using the similarity distance between the inputted color theme to each color theme in the collection. A subset of the most closely related (i.e., shortest similarity distance) color themes is determined and may be laid out or otherwise displayed or printed.

In other embodiments, a computer-readable medium (such as, for example random access memory or a computer disk) comprises code for carrying out these methods.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Illustrative Color Theme Retrieval

Figure 1:
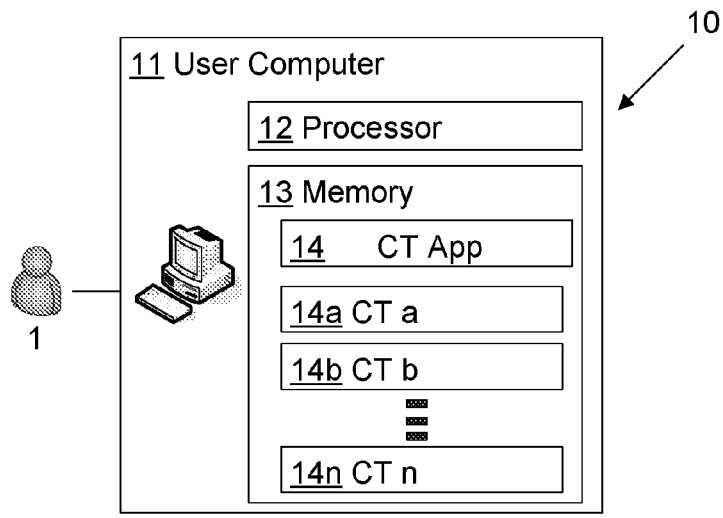
FIG. 1 is a system diagram illustrating an illustrative network environment according to one embodiment of the present invention.

Embodiments of the present invention provide methods and systems for the determination of similar color themes and suggested tags using the relationships amongst tags and color themes. The color themes may consist of an arbitrary number of colors (including a single color) and tags, and the color theme collection may contain color themes having different numbers of colors per color theme (i.e., "Happy" theme may be a four-part color theme and "Sad" theme may be a two-part color theme). For example, in one illustrative embodiment, a user accesses a web site or initiates a color theme application and creates or selects a 5-part color theme, titled "Living" and tagged with "summer," "sun," "vibrant," and "freedom," and saved among a collection of color themes.

The user then decides to search for similar color themes in the collection. In the present example, the user can search using the created color theme only, the tags only, or both the color theme and the associated tags. If the user decides to search using the color theme only, the application determines the distance of the color theme to each color theme in the collection of color themes by quantitatively measuring the color space distance between the color themes. Using this distance measurement, the collection of color themes is ordered according to the closest color themes (i.e., color themes of the collection with the shortest distance to the inputted color theme). A list of similar color themes and/or their associated tags (if any) may be laid out or otherwise displayed or printed, for example, in order of distance.

The application may also recognize relationships between a created color theme and tags within the collection. Tags may be associated with color themes of the collection as titles (for example, the color theme may be titled "Love"), as descriptors (for example, the Love color theme may include the following descriptor tags: "red," "valentine," and "everlasting"), or any combination thereof. In the present example, if the user searches for similar color themes using the tags only, the application will determine the color themes of the collection associated with the identified tag or similar tags, by calculating the distance between the tags of the created color theme and the associated tags (if any) of each of the color themes of the collection. Thus, this provides a quantitative measurement to relate how similar (associated) the color themes are based on the tags. Using the distance measurement, the collection of color themes is ordered according to the closest color themes. For example, color themes of the collection may be ordered in order of distance to the identified tags and used to provide a list of associated color themes and their associated tags may be laid out or otherwise displayed or printed in order of distance.

This illustrative example is given to introduce the reader to the general subject matter discussed herein. The invention is not limited to this example. The following sections describe various additional embodiments and examples of methods and systems for comparing and discovering similar color themes and tags.

Figure 2:
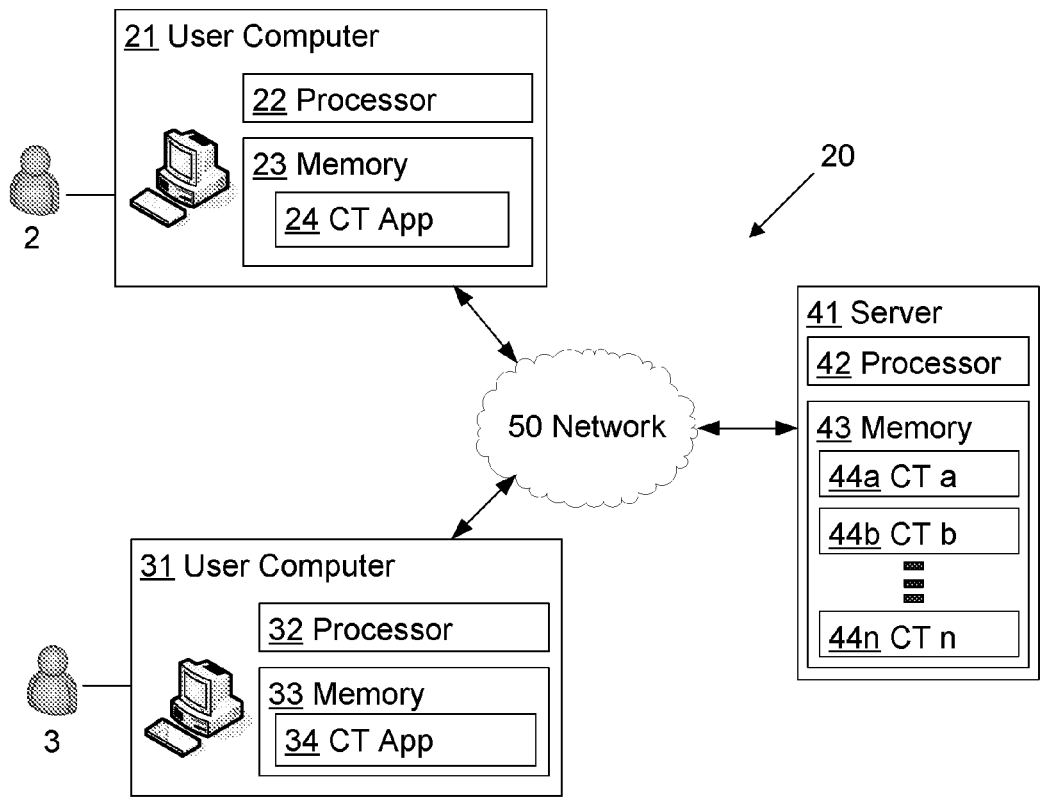
FIG. 2 is a system diagram illustrating an illustrative network environment according to another embodiment of the present invention.

Illustrative Network Configuration for Comparing and Discovering Color Themes and Tags Referring now to the drawings in which like numerals indicate like elements throughout the several figures. FIGS. 1 and 2 are system diagrams illustrating color theme use and management environments according to several embodiments of the present invention. Other embodiments may be utilized. The system 10 shown in FIG. 1 comprises a user computer 11, used by a user 1, that comprises a computer-readable medium such as a random access memory (RAM) 13, coupled to a processor 12 that executes computer-executable program instructions stored in memory. Such a processor 12 may comprise a microprocessor, an ASIC, a state machine, or other processor, and can be any of a number of computer processors, such as processors from Intel Corporation and Advanced Micro Devices, Incorporated (AMD). Such processor may comprise, or may be in communication with, media, for example computer-readable medium, which stores instruction that, when executed by the processor, cause the processor to perform the steps described herein. An alternative system 20 shown in FIG. 2 comprises a wired or wireless network 50 connecting user computers 21, 31, used by user 2 and user 3, respectively, and a server 41. The devices 21, 31, 41 each may comprise a computer-readable medium such as a RAM 23, 33, 43, coupled to a preprocessor 22, 32, 42 that executes computer-executable program instructions stored in memory.

Embodiments of computer-readable medium comprise, but are not limited to, an electronic, optical, magnetic, or other storage or transmission device capable of providing a processor with computer-readable instructions. Other examples of suitable medium comprise, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, ActionScript, and JavaScript.

In FIG. 1, the user computer 11 comprises a color theme application 14 that may reside in memory 13. The color theme application 14, for example, may be an application that allows a user to create, organize, edit, store, import, export, delete, tag, and/or view one or more color themes, among other functions. The color themes themselves are typically graphical representations displayed on a computer screen of a color theme file 14*a-n*. A color theme application may be a dedicated application designed to help a user create, manage and view images, may be a file management application that allows a user to organize color theme files and then launch or otherwise display the contents of the color theme file, whether in that application or through another application. A color theme application may display icons that are based or derived from the content of a color theme file. For example, a color theme application may be a file organizing application that displays color theme files as icons of the color themes themselves.

As illustrated in FIG. 2 methods according to the present invention need not operate within a single device. For example, as illustrated in FIG. 2 users operating separate devices 21, 31 may view or receive color themes 44*a-n* stored on a separate device 41. A network 50, which may be any suitable private network, public network, or the Internet, may be employed to facilitate the sharing of images and to allow different users and different locations to access, manage, view, tag, or otherwise use a collection of color themes, such as color themes 44*a*-44*n*. Additionally, the color theme application 24, 34 may be a desktop color theme application or a web application run through an Internet browser, or any combination thereof, such that the combination of the color theme application 24, 34 with the server 41 through the network 50 provides the users 2, 3 with the functionalities of the present invention. As shown in FIGS. 1 and 2, the application may be color theme application 14, 24, or 34. Alternative configurations are of course possible.

Generally, the devices 11, 21, 31, 41 of FIGS. 1 and 2 may also comprise a number of external or internal devices such as a mouse, a CD-ROM, DVD, a keyboard, a display, or other input or output devices. Examples of such devices are personal computers, digital assistants, personal digital assistants, cellular phones, mobile phones, smart phones, pagers, digital tablets, laptop computers, Internet appliances, and other processor-based devices. In general, a device may involve any type of processor-based platform that operates on any operating system, such as Microsoft® Windows® or Linux, capable of supporting one or more client application programs. Other applications can be contained in memory 13, 23, 33, 43 and can comprise, for example, a word processing application, a spreadsheet application, an e-mail application, a media player application, an instant messenger application, a presentation application, an Internet browser application, a calendar/organizer application, and any suitable application or computer program. For example, the application 24, 34 can simply be an web application run through an Internet browser that permits the users 2, 3 to access, view, or receive color themes 44*a-n* stored on a separate device 41. Other configurations may also involve server devices, mainframe computers, networked computers, and other system configurations appropriate for the particular context.

Certain embodiments of the present invention relate to systems used for color theme smart tag searching and automated tag suggestions on a computing device. It will be recognized that this is merely one context for the methods and other features of the invention described herein. For example, certain embodiments will involve management on a digital scanner or PDA. For example, various techniques of the invention for organizing color themes files using tags are applicable in the color theme file context and in the more general context of any file or other object that can be tagged and organized using, at least in part, the color and tag. The techniques for organizing and displaying content and the other features described herein have uses in a variety of contexts, not to be limited by the specific illustrations provided herein. The systems shown in FIGS. 1 and 2 and methods described herein are merely illustrative and are not intended to recite any system component or feature as essential or necessary to any embodiment of the invention.

Illustrative Embodiment of Color Theme Based Searching

One embodiment of the present invention involves using a color theme to determine other similar color themes and providing those determined similar color themes to the user based on their quantitative similarity to the identified (selected) color theme.

Figure 3:
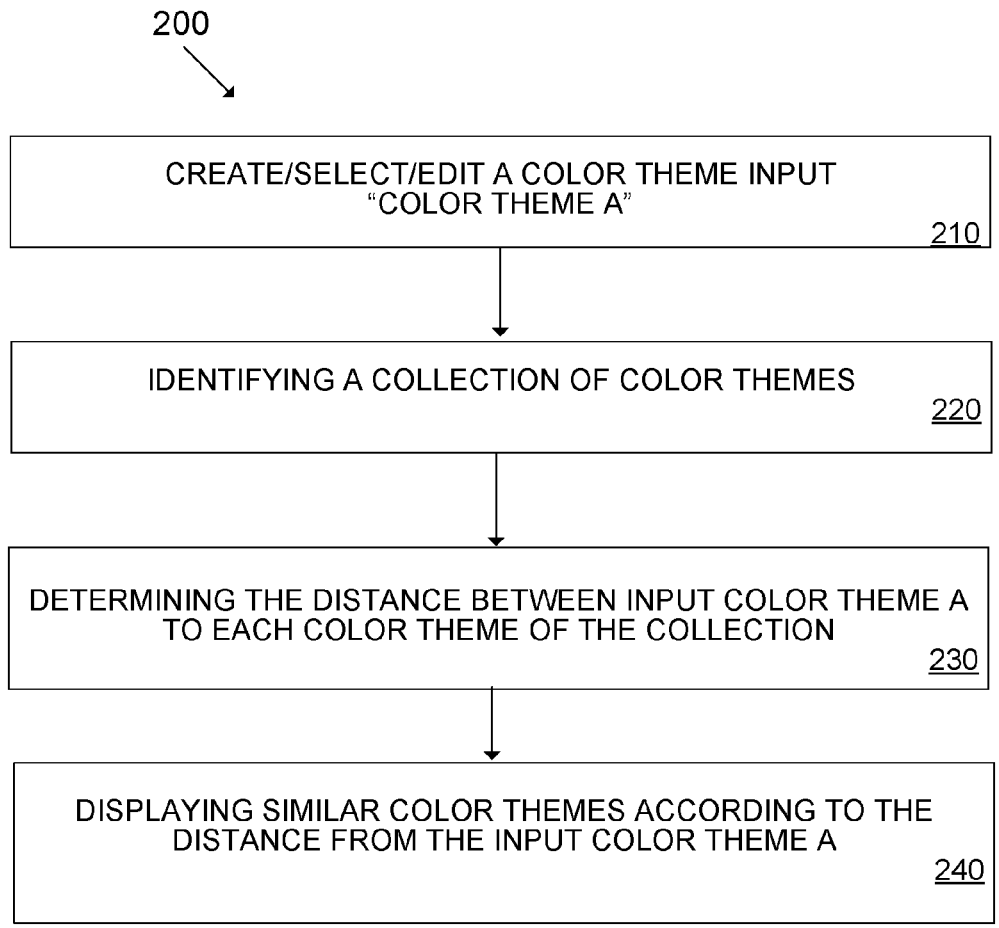
FIG. 3 is a flow chart illustrating one method of determining similar color themes based on an identified color theme according to one embodiment of the present invention.

FIG. 3 is a flow chart illustrating one method of searching for color themes using a selected/inputted color theme according to one embodiment of the present invention. For purposes of illustration only, the elements of this method are described with reference to the systems depicted in FIGS. 1 and 2. A variety of other implementations are also possible.

In the method 200 of comparing and discovering similar color themes shown in FIG. 3, a user 3 provides a Color Theme A to the application 34, as shown in block 210. As illustrated in FIGS. 1 and 2, the application may be color theme application 14, 24, or 34. The Color Theme A, could be a new color theme created by the user, or a color theme selected or edited from a collection of color themes from the application 34, from various other applications, or any other sort of color theme application. For instance, if the user 3 created a new color theme "New Theme" in Adobe® Photoshop®, the user 3 could select the New Theme, for the application 34 to use as Color Theme A.

The application 34 identifies a collection of color themes 44*a-n*, as shown in block 220. The collection of color themes may have been identified by the user 3, for example, by the user selecting a subset of color themes, such as a most popular color themes folder, by the user launching another application, or in any other way. The user need not be involved in the identification of color themes since the color theme application may make the identification of the color theme collection(s) with or without user interaction.

There may be one or more tags associated with some or all of the color themes of the collection. Tags may have been automatically generated, provided by the user or other users, or associated with a color theme in any other suitable manner. For example, if the identified collection is a collection of baby room color themes, over time users may have added or associated tags with the color themes. User may have tagged various color themes with keywords, numbers, or other tags to, for example, describe each color theme's content and/or source. As a specific example, a user may have gone through a color theme collection and labeled all color themes containing shades of blue with a "boy" tag and a tag for the desired effect on a baby boy—a "calming" tag.

While the phrase "color theme" is generally used to refer to a set of colors, the term may also refer to a set of colors and associated tags. For example, each color theme can be expressed as:

color theme={colors,tags}

Wherein, a set of Nc colors will be called "colors" or a color set:

colors={color($c$)}, $c=0,1,\ldots Nc$; and

A set of Nt tags will be called 'tags' or a tag set:

tags={tag($t$)}, $c=0,1,\ldots Nt$;

Where Nc is the number of colors in the color theme, and Nt is the number of word tags in the color theme. These numbers can differ for individual color themes. For example, one color theme may have five colors and three tags, while another color theme has two colors and ten tags.

After identifying a collection of color themes the application 34 determines the distance between Color Theme A to each color theme of the collection, as shown in block 230. Each distance determination includes a color-based distance that is determined by comparing Color Theme A with another color theme. For example, a determination may involve assessing how similar color themes are to Color Theme A. Such a determination may examine Color Theme A and Color Themes B and G of the collection and determine that Color Theme B is most similar because Color Theme A has a color-based distance of five (5) from Color Theme B, in contrast to a color-based distance of eight (8) from Color Theme G of the collection.

The color-based distance between two color themes sets can be expressed as:

color-based distance (colors 1,colors 2);

The distance between color themes uses as its basis the distance between two individual colors, wherein the color-based distance between two single colors can be taken to the Euclidean distance in color space, for example LAB color space:

color=$\{L, a, b\}$, where L is for luminance, and a and b are chrominance values that measure the color along two axis—the a axis and the b axis. Thus:

color-based distance (color1,color2)=square root of $[(L1-L2)^2+(a1-a2)^2+(b1-b2)^2]$.    (5)

Other measures of distance can also be used, such as the Euclidean distance in RGB color space or any other color space or various perceptual distances that have been proposed over the years in the art. Other distance measures can be used as well, such as city block, L3, L4 . . . , minimum, maximum, etc.

Alternatively, in one embodiment of the invention, the calculation of color-based distance between color themes may use a greedy approach to determine how to best match the colors in a first color theme with the colors in a second color theme. The greedy method finds the closest color in a color theme of the collection, for example Color Theme K to all the colors in Input Color Theme J. It then freezes this choice, removing the two matching colors from play, and then continues in like manner until all the colors have been matched. The greedy method is typically faster and more intuitive than a more exhaustive search through all possible combinations of corresponding colors in a first color theme with colors in a second color theme.

For example, if Input Color Theme J is a five-part theme (i.e., contains five colors) and all the color themes of the collections are five-part themes, the greedy method takes color 1 of Color Theme J and compares it to all colors in the first color theme of the collection, Color Theme K. Thus with color 1 (C1) of Color Theme J, the application 34 calculates the distance between C1 of Color Theme J and colors 1-5 (C1-5) of Color Theme K. After determining which color is closest, e.g., C3 of Color Theme K, the greedy method freezes C3 of Color Theme K and C1 of Input Color Theme J.

Next, C2 of Color Theme J is selected and the distance is calculated between C2 of Color Theme J and the remaining 4 (unfrozen) colors (C1, C2, C4 and C5) of Color Theme K. Again once the shortest distance is determined, these two colors are frozen, and the method continues until there are no more colors left unfrozen in Color Theme J.

After determining the color-based distance between colors, the application 34 determines the color-based distance between two color themes. This distance can be expressed as a simple sum of the individual color-based distances calculated above. As an alternative to a simple sum, any aggregation or otherwise suitable technique may be used. For example, the color-based distance between two color themes could be expressed as a root mean squared sum of distances calculated in each step of the greedy method. Alternatively, the color-based distance between two color themes could be calculated as a summation of corresponding pairs of colors, wherein one color of the pair is selected from the first color theme and the other color of the pair selected from the second color theme. This can be expressed as:

color-based distance (colors1,colors2)=$Sum_c$[distance (colors1(c),colors2(c'(c))], where c'(c) is a permutation of the indices which gives the smallest value for this overall distance. In one embodiment of this approach all possible permutations of the color indices are enumerated. For each permutation the color-based distance is calculated between the corresponding colors summed to determine the overall color-based distance between color themes. Lastly, the smallest color-based distance calculation is selected as the overall color-based distance measurement.

For example, if colors1 and colors2 both contain three colors, then color index 'c' may take on three values: c=1, 2, or 3. Thus all possible permutations of the color index 'c' are enumerated as:

| | |
|---|---|
| 1, 2, 3 | 1, 3, 2 |
| 2, 3, 1 | 2, 1, 3 |
| 3, 1, 2 | 3, 2, 1 |

Then for each permutation the color-based distance is calculated between the colors1 and the permuted color2:

$D1$=distance[colors1(1),colors2(1)]+distance[colors1(2),colors2(2)]+distance[colors1(3),colors2(3)]]

$D2$=distance[colors1(1),colors2(1)]+distance[colors1(2),colors2(3)]+distance[colors1(3),colors2(2)]]

$D3$=distance[colors1(1),colors2(2)]+distance[colors1(2),colors2(3)]+distance[colors1(3),colors2(1)]]

$D4$=distance[colors1(1),colors2(2)]+distance[colors1(2),colors2(1)]+distance[colors1(3),colors2(3)]]

$D5$=distance[colors1(1),colors2(3)]+distance[colors1(2),colors2(1)]+distance[colors1(3),colors2(2)]]

$D6$=distance[colors1(1),colors2(3)]+distance[colors1(2),colors2(2)]+distance[colors1(3),colors2(1)]]

The smallest color-based distance calculation is selected as the overall color-based distance between colors1 and colors2. This may be expressed as:

color-based distance (colors1,colors2)=min[$D1,D2,D3,D4,D5,D6$], where min [ . . . ] is a function which chooses the smallest of the values of its arguments. For example, if:

| | |
|---|---|
| D1 = 0.3 | D2 = 0.1 |
| D3 = 0.7, | D4 = 0.2 |
| D5 = 0.3 | D6 = 0.9 | then min [D1, D2, D3, D4, D5, D6]=min[0.3, 0.1, 0.7, 0.2, 0.3, 0.9]=0.1. Thus the overall color-based distance between colors1 and colors2 is 0.1.

The similarity distance may also include a tag-based distance. The tag-based distance between two word tag sets can be expressed as:

tag-based distance (tags1,tags2);

There are many possible ways of determining the distance between word tags. A simple method is to simply count the number of exact word matches between the tag sets. An alternative, is to count the exact word matches and count number of matches between tags, where the pairing removes word stems. For example, the distance between the tags "apple" and "apples" would be counted as zero, because after removing the ending plural stem, "s", from the "apples" tag, the tags are identical.

More sophisticated approaches of using word to word relatedness may be employed to compute tag-based distances. Thus, tag-based distance may also recognize tags that are related to one another even if not identical, such as a color theme tagged with a "baby" tag and another color theme tagged with a "child" tag. Such relatedness amongst tags may be known from the usage of tags together for certain color themes—tag co-occurrence. Tag relatedness may also be known or partially based on a database, thesaurus, and/or other source. For example, semantic tag-based distances can be determined by incorporating a thesaurus or semantic network. Semantic distances enable the color theme application 34 to locate color themes in the database that are not tagged with the exact search term, but with semantically similar tags. In practice, various word search software packages may be implemented to perform the search for entries in the database with matching word tags. In some embodiments, such tag-based distances may be used to determine or create a matrix table holding the relationship between every given pair of tags in the collection. Whether based on shared tags, tag similarity, or otherwise, the tag-based distance may, but need not, be a semantic tag-based distance measure that quantifies the similarity amongst the tags of a collection.

An embodiment of the invention facilitates the identification of semantically related tags or color themes, through the combined use of the color-based distance and the simple tag-based distance, for a total color theme distance. The overall color theme distance can be expressed as:

color theme distance (color theme1,color theme2)=Ac color-based distance (colors1,colors2)+At tag-based distance (tags1,tags2).

Wherein, Ac (A-color) and At (A-tag) are constants which can be chosen to give more or less weight to the color contribution or to the tag contribution. For example, if the color contribution is twice as important as the tag contribution, then the color theme distance can be expressed as:

color theme distance (color theme1,color theme2)= 2*color-based distance (colors1,colors2)+1*tag-based distance (tags1,tags2).

Ac is assigned a value of 2, double that of At (At=1), such that the color contribution will count twice as much as the tag contribution. Alternative approaches to combining the two distances (tag-based and color-based) can also be implemented, including geometric mean, minimum, maximum, etc. For example, the geometric mean color theme distance can be expressed as:

color theme distance (color theme1,color theme2)= square root[color-based distance (colors1,colors2)*tag-based distance (tags1,tags2)].

The minimum color theme distance calculation takes the smaller ("min" minimum) of the color-based and tag-based distances, and may be expressed as:

color theme distance (color theme1,color theme2)= min[color-based distance (colors1,colors2), tag-based distance (tags1,tags2)].

There are many ways of combining the two distances (tag-based and color-based) to determine a combined distance measurement. These examples illustrate some useful methods, but any mathematical combination can be used.

After determining the color theme distances the application 34 displays similar color themes, along with their associated tags (if any) according to the distance from Color Theme A, as shown in block 240. Based on the determined distances, which each include a color-based distance, and may or may not include a tag-based distance, the color themes are displayed to the user sorted by the determined distances, with the shortest distance being displayed first, and so on. The displaying of similar color themes may be based on color themes having distances from Color Theme A less than a threshold value (for example, no color themes with a distance greater than fifty (50)), a predetermined number of color themes (for example, top 100), or any other manner desired.

Illustrative Embodiment of Tag-Based Searching

One embodiment of the present invention involves using a tag to determine color themes based on the identified tag and providing those determined associated color themes to the user based on their quantitative relevance to the identified tag.

Figure 8:
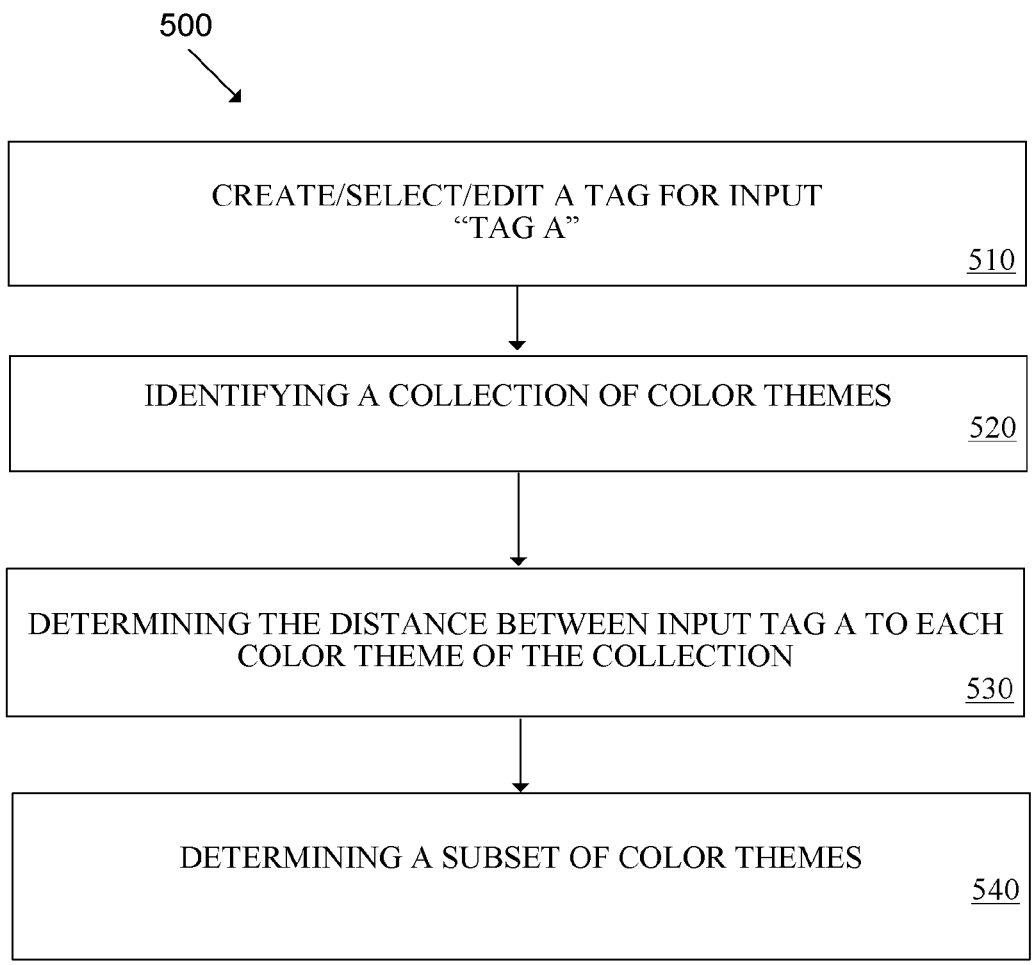
FIG. 8 is a flow chart illustrating one method of determining similar color themes based on an identified tag according to one embodiment of the present invention.

FIG. 8 is a flow chart illustrating one method of discovering color themes based on a selected/inputted tag according to one embodiment of the present invention. For purposes of illustration only, the elements of this method are described with reference to the systems depicted in FIGS. 1 and 2. A variety of other implementations are also possible.

In the method 500 of discovering color themes shown in FIG. 8, a user 3 provides a tag—Tag A to the application 34, as shown in block 510. The Tag A, could be a new tag created by the user, or a tag selected or edited from a collection of color themes with associated tags from the application 34, from various other applications, or any other sort of color theme application.

Next, the application 34 identifies a collection of color themes 44a-n, as shown in block 520. The collection of color themes may have been identified by the user 3, for example, by the user selecting a subset of color themes, such as a most popular color themes folder, by the user launching another application, or in any other way. The user need not be involved in the identification of color themes since the color theme application may make the identification of the color theme collection(s) with or without user interaction. There may be one or more tags associated with some or all of the color themes of the collection. Tags may have been automatically generated, provided by the user or other users, or associated with a color theme in any other suitable manner.

After identifying the collection of color themes the application 34 determines color theme distances between the identified tag and each color theme of the collection, as shown in block 530. The color theme distances between the identified tag and the color themes of the collection comprise tag-based distances between the identified tag and each tag associated with the color themes of the collection.

Next, the application 34 determines a subset of color themes similar to the identified tag, as shown in block 540. This subset is determined by comparing the color theme distances of the collection to the identified tag. This subset of color themes represents those color themes of the collection most similarly related (associated) to the identified tag. The subset may be displayed and sorted according to the determined color theme distances.

Another Illustrative Embodiment of Tag-Based Searching

One embodiment of the present invention involves using a tag to determine suggested tags based on the identified tag and providing those determined suggested tags to the user based on their quantitative relevance to the identified tag.

Figure 9:
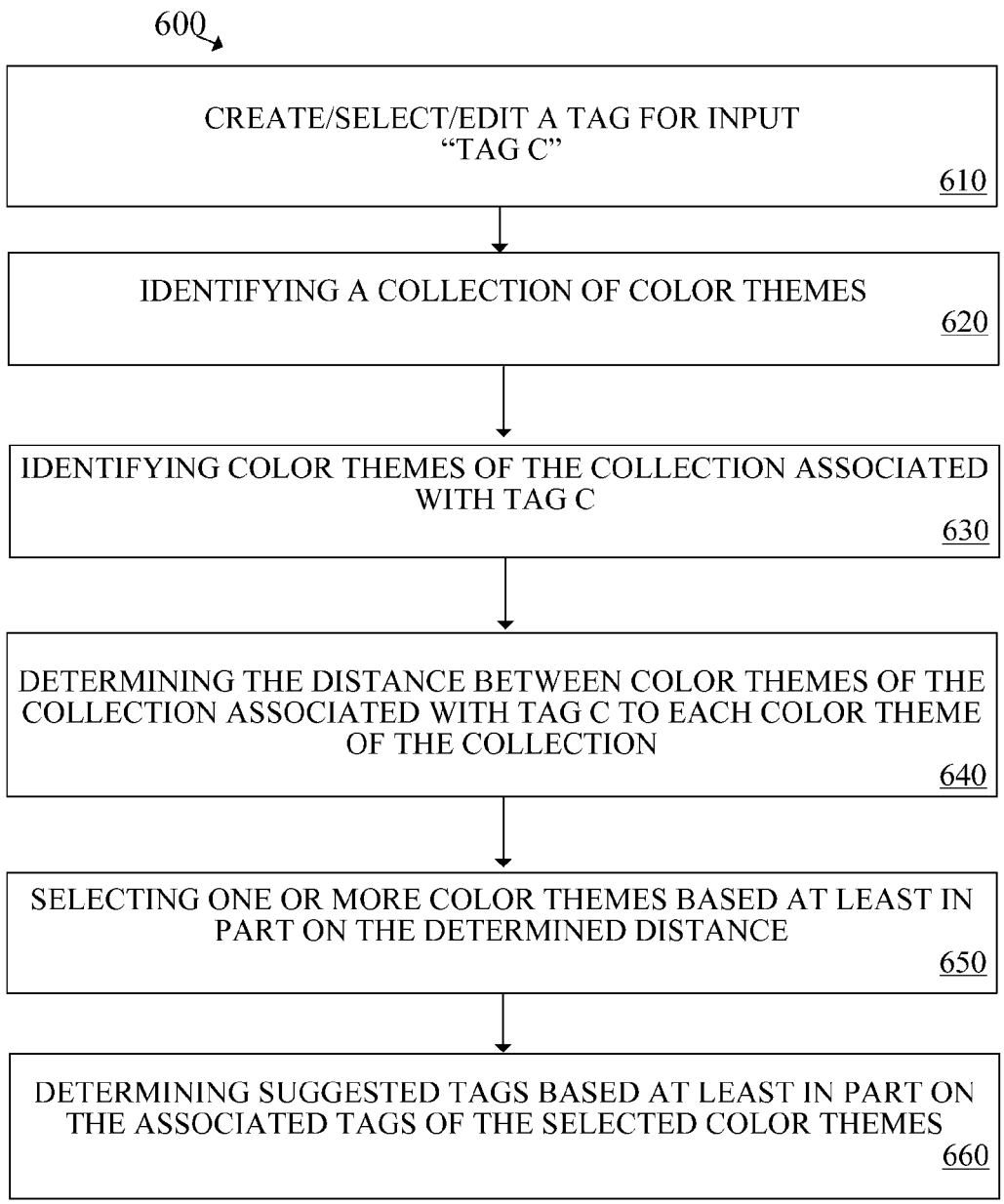
FIG. 9 is a flow chart illustrating one method of determining suggested tags based on an identified tag according to one embodiment of the present invention.

FIG. 9 is a flow chart illustrating one method of discovering suggested tags based on a selected/inputted tag according to one embodiment of the present invention. For purposes of illustration only, the elements of this method are described with reference to the systems depicted in FIGS. 1 and 2. A variety of other implementations are also possible.

In the method 600 of discovering suggested tags shown in FIG. 9, a user 3 provides a tag—Tag C to the application 34, as shown in block 610. The Tag C, could be a new tag created by the user, or a tag selected or edited from a collection of color themes with associated tags from the application 34, from various other applications, or any other sort of color theme application.

Next, the application 34 identifies a collection of color themes 44a-n, as shown in block 620. The collection of color themes may have been identified by the user 3, for example, by the user selecting a subset of color themes, such as a most popular color themes folder, by the user launching another application, or in any other way. The user need not be involved in the identification of color themes since the color theme application may make the identification of the color theme collection(s) with or without user interaction. There may be one or more tags associated with some or all of the color themes of the collection. Tags may have been automatically generated, provided by the user or other users, or associated with a color theme in any other suitable manner.

After identifying the collection of color themes the application 34 determines color themes of the collection associated with the input Tag C, as shown in block 630. The application 34 may also recognize color themes with associated tags that are related to Tag C even if not identical, such as based on shared tags, tag similarity, semantics, or otherwise. The application 34 identifies all color themes of the collection that are associated with the Tag C in order to identify a general set of color themes for input Tag C.

After identifying the specific color themes of the collection associated with Tag C, the application 34 determines distances between the identified color themes associated with Tag C and each color theme of the collection, as shown in block 640. The color theme distances between the identified color themes associated with Tag C and the color themes of the collection comprise color-based distances between the identified color themes associated with Tag C and each color theme of the collection.

Next, the application 34 selects one or more color themes based at least in part on the distances to the identified color themes associated with Tag C, as shown in block 650. The selected color themes are determined at least in part by comparing the distances of the color themes of the collection to the identified color themes associated with Tag C.

After selecting one or more color themes, the application 34 determines suggested tags based at least in part on the associated tags of the selected color themes, as shown in block 660. This set of tags based at least in part on the associated tags of the selected color themes represents suggested tags for the identified tag, Tag C. The suggested tags may be displayed and sorted according to the determined color theme distances.

Figure 4:
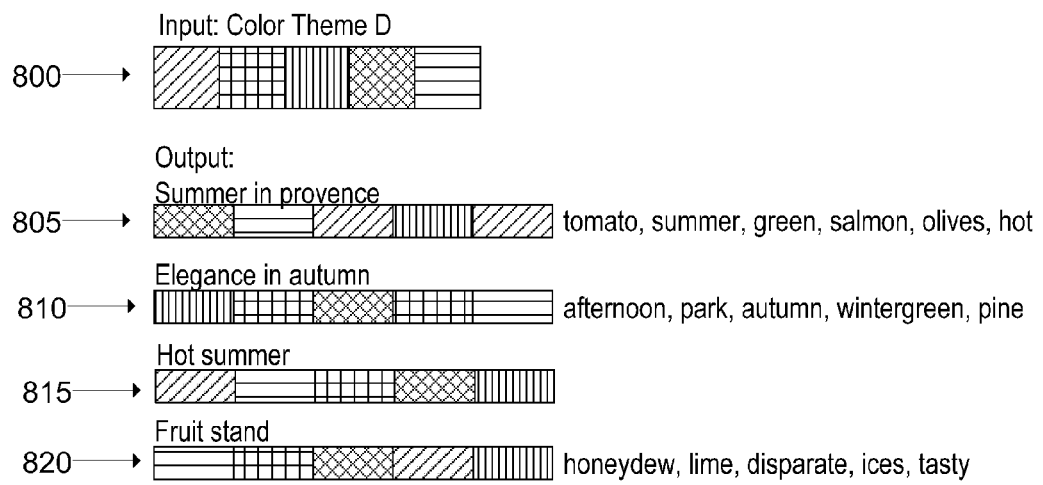
FIG. 4 is an exemplary illustration of color theme search results produced according to one embodiment of the present invention.

Illustrative Embodiments of Displaying Search Results of Similar Color Themes and/or Suggested Tags FIG. 4 is an exemplary color theme search output according to one embodiment of the present invention. In the example, Color Theme D 800 is created or identified for input into the application 34, and the application 34 compares, determines and displays a list of similar color themes 805, 810, 815, and 820 along with associated word tags (if any), ordered according to the determined overall color theme distances. Even though the application 34 did not find an exact color theme match (i.e., Color Theme D 800 was not in the color theme collection), the list contains those color themes most similarly related to the input color theme, based on the determined overall color theme distances to Color Theme D.

As illustrated in FIG. 4, the list of similar color themes may or may not contain associated descriptor tags.

Figure 5:
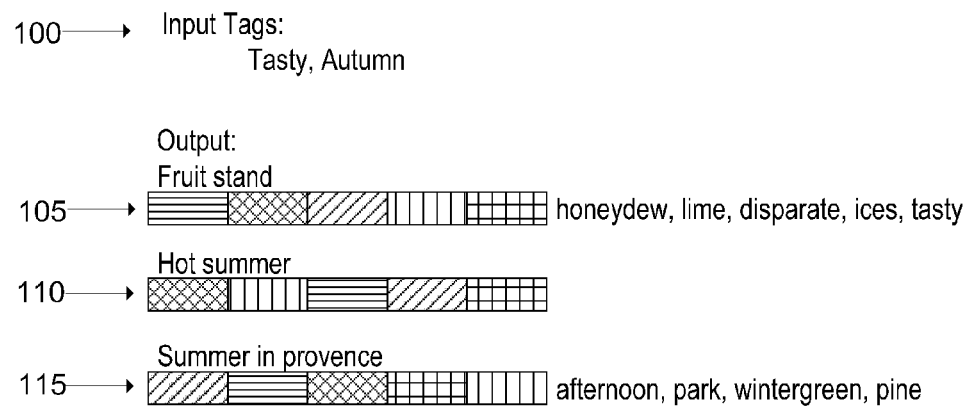
FIG. 5 is another exemplary illustration of color theme search results produced according to another embodiment of the present invention.

FIG. 5 is an exemplary color theme search output according one embodiment of the present invention. In the example, a user 3 inputs some search tags—"Tasty" and "Autumn" 100 into the application 34. The application 34 compares, determines, and displays a list of similar color themes along with associated tags (if any), ordered according to the determined overall color theme distances. As illustrated, the first discovered color theme "Fruit stand" 105 is tagged with the tasty tag. The second discovered color theme "Hot summer" 110 does not contain associated descriptor tags. However, it is listed second based on its color similarity to the set of colors in the Fruit Stand 105 color theme tagged with one of the search tags, tasty. Additionally, the third discovered color theme "Summer in provence" 115 does not contain any associated tags exactly matching the search tags.

According to one embodiment of the present invention, this color theme results lists shown in FIG. 5, is determined by first determining color themes in the collection that contain the search tags, or if a more complex tag-based distance measure is used, determining color themes which have a small tag-based distance to the search tags. The associated color themes are then used to expand the search. For example, the application 34 may take the ten closest color themes based on the determined tag-based distances, and for each color theme of this set, determine the ten closest color themes in the rest of the collection, using the color theme distance (color theme1, color theme2) as expressed earlier. Thus, from the determined 100 closest color themes, a selected number can be presented to the user 3, as illustrated in FIG. 5 (only four color themes are shown).

More generally, although not illustrated, both a set of word terms and a set of colors can be used as input in another embodiment of the invention. A similar process to the one described above may be used to return color themes having similar colors and/or words based on the determined color theme distances.

Figure 6:
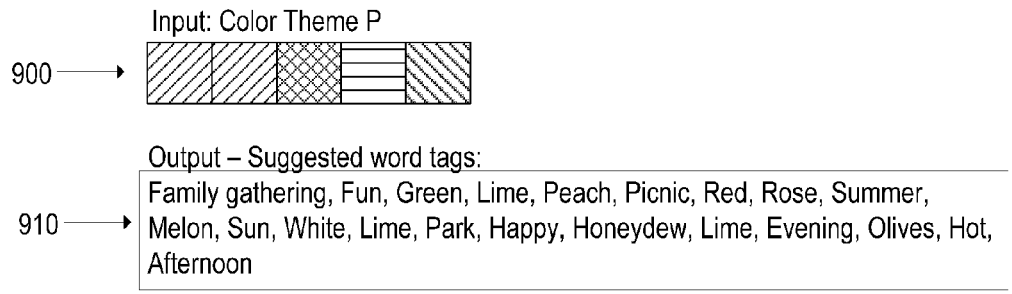
FIG. 6 is an exemplary illustration of suggested tags results produced according to one embodiment of the present invention.

FIG. 6 is an exemplary suggested tags output according to one embodiment of the present invention. In the example, Color Theme P 900 is inputted into the color theme application 34, and the color theme application 34 compares, determines and displays a list of suggested tags 910. According to one embodiment of the present invention, each of the associated tags for the closest color themes (as determined based on the color theme distances) are assigned a weight equal to the color theme distance for the associated color theme, and then the suggested tags are displayed to the user ordered according to the weight. For example, if Color Theme Y, tagged with tag "family gathering" had the closest color theme distance of 2 to Color Theme P, then the "family gathering" tag would be assigned a weight of 2. In the case where a tag is associated with at least two color themes, the tag is assigned a weight equal to the lowest associated color theme distance. For example if tag "fun" was associated with two color themes— Color Theme X with a color theme distance of 4 to Color Theme P, and Color Theme Q with a color theme distance of 3 to Color Theme P, then the tag "fun" would be assigned a weight of 3, the closest associated color theme distance. As illustrated in FIG. 6, the suggested tags 910 lists "family gathering" first, followed by "fun" second, and so on. Of course the suggested tags could also be sorted according to tag-based distances, color-based distances, or any other desired sorting approach.

Figure 7:
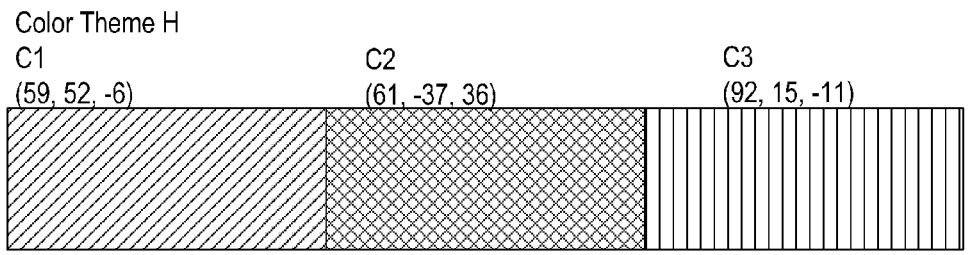
FIG. 7 is an exemplary illustration of calculating color-based distances between color themes according to one embodiment of the present invention.
Figure 7:
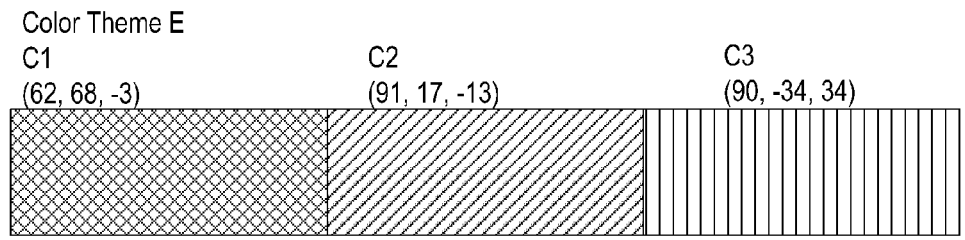
Figure 7:
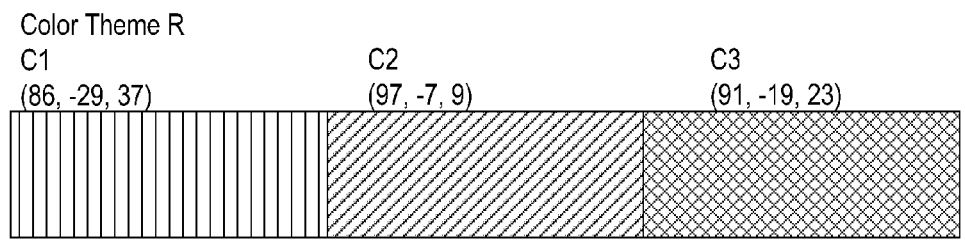

FIG. 7 is an exemplary illustration of calculating color-based distances between color themes according to one embodiment of the present invention. As shown, Color Themes H, E, and R are shown with the colors indicated in 8-bit Lab (L, a, b) values. For example, the color-based distance between Color Theme H—C1 and Color Theme E—C1 is:

$$\text{sqrt}[(59-62)^2+(52-68)^2+(-6-(-3))^2]=\text{sqrt}[3^2+16^2+3^2]=16.6$$

Table 1 shows the calculated color-based distances between each color in Color Theme H and Color Theme E, using the values shown in FIG. 7:

TABLE 1

|  | Color Theme E C1 | Color Theme E C2 | Color Theme E C3 |
|---|---|---|---|
| Color Theme H C1 | 16.6* | 47.9 | 99.8 |
| Color Theme H C2 | 112.0 | 78.8 | 29.2* |
| Color Theme H C3 | 61.4 | 3.0* | 66.6 |

As marked with an "*", the smallest color-based distance for each row, represent the two closest colors for each pairing. Thus the closest color to Color Theme H—C1 is C1 of Color Theme E, and so on. Using Table 1, the color-based distance between Color Theme H and Color Theme E, according to one embodiment of the present invention, can be expressed as:

$$\text{color-based distance (Color Theme } H\text{,Color Theme } E)=16.6+19.2+3.0=48.8$$

Similarly, Table 2 shows the calculated color-based distances between all colors in Color Theme H and Color Theme R, using the values shown in FIG. 7:

TABLE 2

|  | Color Theme R C1 | Color Theme R C2 | Color Theme R C3 |
|---|---|---|---|
| Color Theme H C1 | 95.6 | 71.8* | 83.1 |
| Color Theme H C2 | 26.3* | 54.1 | 37.3 |
| Color Theme H C3 | 65.4 | 30.1* | 48.1 |

As marked with an "*", the smallest color-based distance for each row, represent the two closest colors for each pairing. Thus the closest color to Color Theme H—C1 is C2 of Color Theme R, and so on. Using Table 2, the color-based distance between Color Theme H and Color Theme R, according to one embodiment of the present invention, can be expressed as:

$$\text{color-based distance (Color Theme } H\text{,Color Theme } R)=71.8+26.3+30.1=128.2$$

Comparing the color-based distances between Color Theme H and Color Themes E and R, it is shown that Color Theme E is the closest (48.8) and Color Theme R (128.2) is farther away from Color Theme H. Thus assuming no associated tags, Color Theme E would be determined to be the most similar, using Color Theme H as input.

Also note that for the overall color-based distances, the square root of the squared distances could also have been used to compute the color-based distances as follows:

$$\text{color-based distance (Color Theme 1,Color Theme 2)}=\text{sqrt}(16.6^2+19.2^2+3.0^2)=33.7$$

$$\text{color-based distance (Color Theme 1,Color Theme 3)}=\text{sqrt}(71.8^2+26.3^2+30.1^2)=82.2$$

Color Theme E is the most similar to Color Theme H under this method as well.

According to another embodiment of the present invention, involving the greedy method (explained above), Table 3 shows the calculated color-based distances between all colors in Color Theme H and Color Theme R, using the values shown in FIG. 7:

TABLE 3

|  | Color Theme R C1 | Color Theme R C2 | Color Theme R C3 |
|---|---|---|---|
| Color Theme H C1 | 95.6 | ^71.8* Freeze | 83.1 |
| Color Theme H C2 | ^26.3* Freeze | 54.1-- | 37.3-- |
| Color Theme H C3 | 65.4-- | ^30.1-- | 48.1* |

As shown in Table 3, the distances marked with a "^", the smallest color-based distances for each row, are not necessarily the same distances used in the greedy method color-based distance calculation, marked with an "*". In this example, using the greedy method, by the time the application calculates the color-based distance to Color Theme H—C3, C1 and C2 of Color Theme R have been frozen, leaving only C3 of Color Theme R available, even though it is not the closest (i.e., the distances marked with "--" would not be actually calculated in an embodiment of the present application using the greedy method). Thus the closest C1 of Color Theme H is paired to—C2 of Color Theme R, and so on as marked with an "*". Using Table 3, the color-based distance between Color Theme H and Color Theme R, according to one embodiment of the present invention, can be expressed as:

$$\text{color-based distance (Color Theme } H\text{,Color Theme } R)=71.8+26.3+48.1=146.1$$

This color-based distance (146.1), as determined by using the greedy method is greater than color-based distance (128.2) determined using the method shown in Table 2. However, using either method does not alter the determined similarity of the color themes.

For example, re-evaluating the color-based distances between Color Theme H and Color Themes E and R, using one calculation determined by the greedy method, it is still shown that Color Theme E is the closest (48.8) and Color Theme R (146.1) (using the greedy method) is farther away from Color Theme H. Thus assuming no associated tags, Color Theme E would be determined to be the most similar to Color Theme H under this method as well.

However, the ordering of color themes may not always be the same using either method. In one embodiment of the present invention the greedy method may be used because it is computationally faster. Additionally, an embodiment of the present invention may use the greedy method because it provides an intuitive method which may be more desirable in matching color themes as it is comparable to the approach people take to match color themes—matching the most similar colors first.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. A method comprising:
   identifying, at a computer, a collection of color themes, each color theme of the collection of color themes comprising at least one color;
   identifying, at the computer, a color theme, the identified color theme comprising at least one color;
   determining, by the computer, a distance for each color theme of the collection of color themes from the identified color theme, wherein each distance comprises a color-based distance determined by comparing the identified color theme with the respective color theme of the collection of color themes, wherein, at least one color theme of the collection is a multi-color color theme comprising multiple colors, wherein the distance of the multi-color color theme from the identified color theme is determined based at least in part on color-to-color distances between at least one color of the identified color theme and each of the multiple colors of the multi-color color theme; and
   selecting, by the computer, a subset of color themes from the collection of color themes based at least in part on the distances from the identified color theme.

2. The method of claim 1, wherein the identified color theme comprises at least two colors.

3. The method of claim 1, wherein the distance of each color theme of the collection of color themes from the identified color theme is based at least in part on determination of color-to-color distances of each color of the identified color theme to a color of the color theme of the collection, wherein each color-to-color distance uses a different color of the color theme of the collection.

4. The method of claim 3, wherein determination of color-to-color distances comprises:
   a first determination of a first closest color of the color theme of the collection to a first color of the identified color theme, the first determination comprising comparing the first color of the identified color theme with each color of the color theme of the collection; and
   a second determination of a second closest color of the color theme of the collection to a second color of the identified color theme, the second determination comprising comparing the second color of the identified color theme with each color of the color theme of the collection except the first closest color.

5. The method of claim 1, wherein the identified color theme is a color theme in the collection of color themes.

6. The method of claim 5, wherein determining each color-based distance from the identified color theme further comprises comparing each color of the identified color theme to each color of each color theme of the collection of color themes.

7. The method of claim 1, wherein determining each color-based distance from the identified color theme comprises determining a distance between at least a color in the identified color theme and at least a color in a second color theme.

8. The method of claim 1, wherein determining each color-based distance from the identified color theme further comprises comparing at least a color of the identified color theme to at least a color of each color theme of the collection of color themes.

9. The method of claim 1, wherein determining each color-based distance from the identified color theme further comprises determining a sum of color to color distances between the individual colors of the identified color theme and the individual colors of each of the color themes of the collection of color themes.

10. The method of claim 1, wherein selecting a subset of color themes further comprises selecting color themes with distances from the identified color theme that are less than the distances of color themes not selected.

11. The method of claim 1, wherein selecting a subset of color themes further comprises selecting color themes of the collection of color themes having distances from the identified color theme less than a threshold value.

12. The method of claim 1, wherein selecting a subset of color themes further comprises selecting a predetermined number of color themes from the subset of color themes.

13. A method comprising:
    identifying, at a computer, a collection of color themes, each color theme of the collection of color themes comprising at least one color, wherein at least some of the color themes in the collection of color themes comprise at least one associated word tag;
    identifying, at the computer, a color theme, the identified color theme comprising at least one color;
    determining, by the computer, a distance for each color theme of the collection of color themes from the identified color theme,
       wherein a distance of at least one respective color theme of the collection from the identified color theme is based at least in part on color-to-color distances; and
       wherein a distance of at least one other respective color theme of the collection from the identified color theme is based at least in part on a tag-based distance determined by comparing at least one tag associated with the identified color theme and at least one tag associated with the at least one other respective color theme; and
    selecting, by the computer, a subset of color themes from the collection of color themes based at least in part on the distances from the identified color theme.

14. The method of claim 13, wherein each tag-based distance is determined by calculating a semantic distance between at least one tag associated with the identified color theme and at least one tag associated with a color theme of the collection of color themes.

15. A method comprising:
    identifying, at a computer, a collection of color themes, each color theme of the collection of color themes comprising at least one color, at least some of the color themes in the collection of color themes comprise at least one associated word tag, the word tags associated with one or more of the color themes;
    identifying, at the computer, a color theme, the identified color theme comprising at least one color;
    determining, by the computer, a distance for each color theme of the collection of color themes from the identified color theme, wherein each distance comprises a color-based distance determined by comparing the identified color theme with the color theme of the collection of color themes; and
    determining, by the computer, a weight for each associated word tag using the color-based distances determined for the color themes; and providing, by the computer, at least some of the associated word tags as suggested tags for the identified color theme based on the determined weight for each associated word tag.

16. The method of claim 15, wherein determining a weight for each associated word tag further comprises assigning the weight for each word tag equal to the determined color-based distance for the associated color theme, wherein if there is more than one associated color theme, assigning the smallest color-based distance.

17. The method of claim 15 wherein the suggested tags are ordered according to the determined weight.

18. A method comprising:
identifying, at a computer, a tag;
identifying, at the computer, a collection of color themes, each color theme of the collection of color themes comprising at least two colors, at least one color theme of the collection of color themes comprising at least one associated tag;
for each color theme of the collection of color themes, determining, by the computer, a distance between the identified tag and the respective color theme of the collection, wherein the distance comprises a tag-based distance determined by comparing the identified tag with each associated tag of the respective color theme; and
selecting, by the computer, a subset of color themes from the collection of color themes based at least in part on the distances of the color themes of the collection of color themes to the identified tag.

19. The method of claim 18, wherein determining each tag-based distance from the identified tag further comprises determining a sum of the tag-based distances for associated tags in each color theme.

20. The method of claim 18, further comprising:
using the subset of color themes, for each color theme of the subset of color themes:
determining a color-based distance between each color in the color theme and each color in each color theme in the collection of color themes; and
determining a color-based distance between the color theme and each color theme in the collection of color themes by determining a sum of the color-based distances for colors in each color theme; and
determining additional color themes from the collection of color themes using the summed color-based distances.

21. A method comprising:
identifying, at a computer, a tag;
identifying, at the computer, color themes tagged with the identified tag in a collection of color themes, each color theme comprising at least two colors;
determining, by the computer, a color-based distance between each color theme tagged with the identified tag and each other color theme of the collection of color themes;

selecting, by the computer, one or more color themes from the collection of color themes based at least in part on the color-based distance between the selected color theme and a color theme tagged with the identified tag; and
determining, by the computer, suggested tags for the identified tag based at least in part on associated tags used to tag the selected color themes.

22. A system for selecting color themes, comprising:
a computer-readable medium that stores at least one collection of color themes, each color theme of the collection of color themes comprising at least two colors; and
a computer system configured to:
identify a color theme comprising at least two colors;
identify a collection of color themes from the computer-readable medium;
for each color theme of the collection of color themes, determine distances from the identified color theme, wherein each distance comprises a color-based distance determined by comparing the identified color theme with the respective color theme, wherein the distance of a multi-color color theme from the identified color theme is determined based at least in part on color-to-color distances between at least one color of the identified color theme and each of the multiple colors of the multi-color color theme; and
select a subset of color themes from the collection of color themes based at least in part on the distances from the identified color theme.

23. The system of claim 22 further comprising, a display device to display the subset of color themes from the collection of color themes associated with the identified color theme.

24. A non-transitory computer-readable medium on which is encoded program code for selecting color themes, the program code comprising:
program code for identifying a tag;
program code for identifying a collection of color themes, each color theme of the collection of color themes comprising at least two colors, at least one color theme of the collection of color themes comprising at least one associated tag;
program code for determining for each color theme of the collection of color themes, a distance between the identified tag and the color theme, wherein the distance comprises a tag-based distance determined by comparing the identified tag with each associated tag of the respective color theme; and
program code for selecting a subset of color themes from the collection of color theme based at least in part on the distances from the identified tag.

* * * * *